United States Patent
Yang

(10) Patent No.: US 6,990,148 B2
(45) Date of Patent: Jan. 24, 2006

(54) APPARATUS FOR AND METHOD OF TRANSFORMING SCANNING FORMAT

(75) Inventor: Seung-joon Yang, Suwon-city (KR)

(73) Assignee: Samsung Electronics Co., Ltd., Suwon (KR)

( * ) Notice: Subject to any disclaimer, the term of this patent is extended or adjusted under 35 U.S.C. 154(b) by 435 days.

(21) Appl. No.: 10/349,216

(22) Filed: Jan. 23, 2003

(65) Prior Publication Data

US 2003/0161403 A1  Aug. 28, 2003

(30) Foreign Application Priority Data

Feb. 25, 2002  (KR) ........................................ 2002-10002

(51) Int. Cl.
*H04N 7/12* (2006.01)

(52) U.S. Cl. ............. 375/240.16; 375/240; 375/240.01; 375/240.12

(58) Field of Classification Search ............ 375/240.16, 375/240, 240.01, 240.12
See application file for complete search history.

(56) References Cited

U.S. PATENT DOCUMENTS 6,088,397 A * 7/2000 Jeannin ................. 375/240.16
6,259,737 B1 * 7/2001 Fung et al. ............ 375/240.16

FOREIGN PATENT DOCUMENTS

| EP | 0 691 789 A2 | 1/1996 |
| EP | 1 075 147 A1 | 2/2001 |
| EP | 1 164 792 A2 | 12/2001 |

* cited by examiner

*Primary Examiner*—Allen Wong
(74) *Attorney, Agent, or Firm*—Staas & Halsey LLP

(57) ABSTRACT

An apparatus for and a method of transforming a scanning format can adaptively select a scanning format transformation method. A motion estimating unit estimates a final motion vector among the motion vectors determined by a full search and predicted motion estimation and determines a first motion estimation type of the final motion vector. A motion analyzing unit and a motion estimation type analyzing unit respectively determine an existence of a global motion and a third motion estimation type from the final motion vector. A motion compensating unit and a temporal-spatial interpolating unit generate a first pixel and a second pixel, respectively. A format transforming unit transforms the scanning format by adaptively selecting one of the first and second pixels on a basis of at least one of the third motion estimation type and the information on the existence of the global motion. As a result, the scanning format transformation method can be adaptively selected from a motion compensation method and a temporal-spatial interpolation method according to the motion type.

55 Claims, 10 Drawing Sheets

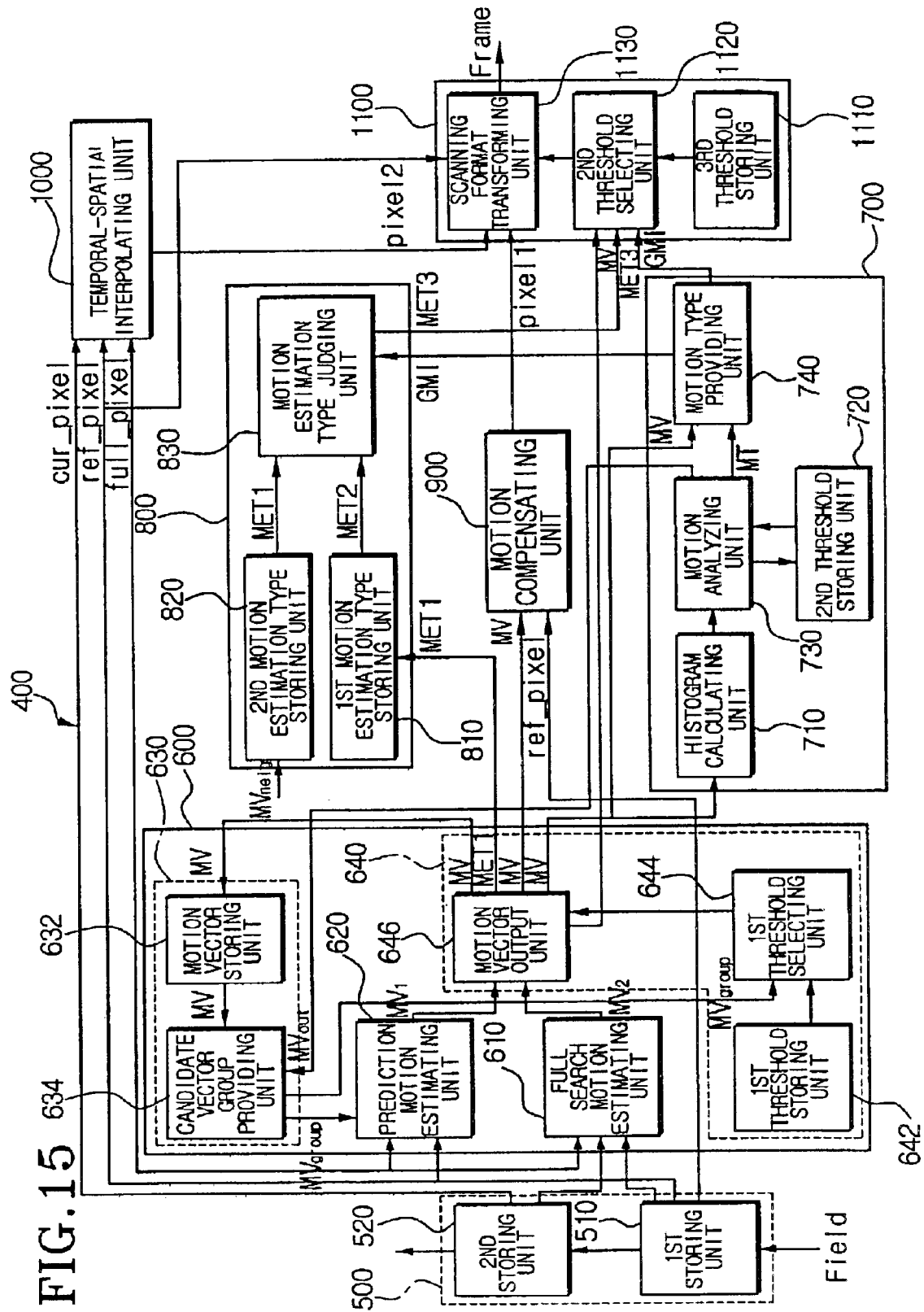

APPARATUS FOR AND METHOD OF TRANSFORMING SCANNING FORMAT

CROSS-REFERENCE TO RELATED APPLICATIONS

This application claims the benefit of Korean Patent Application No. 2002-10002, filed Feb. 25, 2002, in the Korean Intellectual Property Office, the disclosure of which is incorporated herein by reference.

BACKGROUND OF THE INVENTION

1. Field of the Invention

The present invention relates to an adaptive apparatus for and method of transforming a scanning format, and more particularly, to an improved adaptive apparatus for and method of transforming a scanning format by adaptively selecting interpolation according to motion compensation and temporal-spatial time division.

2. Description of the Related Art

Recently, digitalization of information relating to multimedia has been rapidly developed. Accordingly, a compression technology of image signals has attracted considerable attention of the multimedia industry. Compression encoding and decoding enable transmission of the image signals using a low rate channel and a reduction of a requirement for a capacity of a memory storing the image signals. Therefore, the compression encoding and decoding are very important technologies in the multimedia industry requiring applications, such as a storage and transmission of the image signals.

Most of the image signals have redundancy due to autocorrelation. The redundancy is classified into temporal redundancy and spatial redundancy on a two-dimensional space. The temporal redundancy can be reduced according to motion estimation and compensation in block units, and the spatial redundancy can be reduced according to discrete cosine transform (DCT). By decreasing such redundancies, a motion pictures experts group (MPEG) can improve data compression effects of a video frame/field varied by time.

For this, it is necessary to search most similar blocks between a consecutively inputted reference frame/field and current frame/field, which is called motion estimation. In addition, a degree of a displacement in a motion of a block is called a motion vector.

In general, a block matching algorithm (BMA) is used to estimate the motion vector. The BMA compares two consecutive images, such as the reference frame/field and the current frame/field in block units, and estimates the motion on a basis of matching of signal types. According to the BMA, the motion vector is estimated by referring to the reference frame/field and the current frame/field, and motion compensation prediction is performed by using the estimated motion vector.

FIG. 1 is a block diagram illustrating a general structure of a conventional apparatus 100 for transforming a scanning format, and FIG. 2 is a diagram illustrating an image division in the conventional apparatus 100 shown in FIG. 1.

Referring to FIG. 1, the conventional apparatus 100 transforming the scanning format includes an image dividing unit 110, a motion estimating unit 120, a motion vector improving unit 130 and a motion compensation interpolating (MCI) unit 140.

The image dividing unit 110 serves to divide an external input signal into change/unchanged regions. In addition, as shown in FIG. 2, the image dividing unit 110 divides the unchanged region into covered/uncovered regions, a background, and a moving object. In FIG. 2, 'Frame t' denotes a current frame, 'Frame (t−1)' denotes a preceding frame, and 'Frame (t+1)' denotes a succeeding frame. Accordingly, the apparatus 100 for transforming the scanning format can apply appropriate motion compensation interpolations to each region.

FIG. 3 is a block diagram illustrating a basic structure of the motion estimating unit 120 of the conventional apparatus 100 as shown in FIG. 1.

As illustrated in FIG. 3, the motion estimating unit 120 includes a reference frame/field storing unit 122, a current frame/field storing unit 124 and a full search motion estimating unit 126. The motion estimating unit 120 estimates the motion in pixel or block units.

The reference frame/field storing unit 122 and the current frame/field storing unit 124 respectively store pixel data of the reference frame/field and the current frame/field. The pixel data of the reference frame/field and the current frame/field are used to estimate the motion vector. The full search motion estimating unit 126 estimates the motion vector in a full search method by using the frames/fields stored in the reference frame/field storing unit 122 and the current frame/field storing unit 124.

The full search method determines a search range and considers whole blocks located within a maximum displacement of the search range. That is, the full search method selects a position of the block showing a minimum matching error among the blocks as the motion vector. In the full search method, pattern matching is performed on the whole blocks of the reference frame/field and the current frame/field in the search range. As far as a real motion of the block does not exceed the search range, the full search method can search the motion vector of high accuracy.

However, when an appropriate motion vector is not searched in the full search method, visual effects are decreased as compared with the method which does not use the motion vector. In this case, the motion vector improving unit 130 must refine an inappropriate motion vector obtained in the motion estimating unit 120 according to the BMA. It is therefore possible to improve the inappropriate motion vector obtained in the motion estimating unit 120.

The MCI unit 140 searches a forward motion vector for the preceding and succeeding frames of the image to be interpolated, and performs the motion compensation and interpolation on the image. Here, the MCI unit 140 uses a simple MCI method and a linear interpolation method in block units. In the simple MCI method, the motion is searched in a local area. The searched motion is introduced to the linear interpolation method, thereby simplifying calculation of the motion compensation.

In addition, the MCI unit 140 embodies the image to be interpolated by using the estimate motion vector corresponding to the regions divided by the image dividing unit 110. That is, according to the simple MCI, the motion compensation and interpolation on the image use motion information of the adjacent images such as the preceding and succeeding frames. Accordingly, the scanning format is transformed.

However, when the size of the blocks increases, the motion estimation using the full search method fails to estimate a smooth motion vector reflecting a real motion. A predicted motion estimation method can be employed to solve the foregoing problem. However, the inappropriate motion vector is used as a candidate motion vector in the predicted motion estimation method, and thus a precise motion vector may not be searched. As a result, although the motion compensation prediction is carried out, the visual effects may be decreased as compared with the method which does not use the motion information. Moreover, the scanning format is transformed merely by the motion compensation using the motion vector. It is thus difficult to smoothly precisely perform the motion estimation.

SUMMARY OF THE INVENTION

It is, therefore, an aspect of the present invention to provide an apparatus for and method of transforming a scanning format which can adaptively select a scanning format transformation method of macro blocks in response to a motion vector, a motion type, and an accuracy of motion estimation.

Additional aspects and advantages of the invention will be set forth in part in the description which follows and, in part, will be obvious from the description, or may be learned by practice of the invention.

To achieve an aspect of the invention, an apparatus for transforming a scanning format includes a motion estimating unit estimating a final motion vector of a block to be interpolated by selecting one of a first motion vector determined by a full search and a second motion vector predicted by a candidate motion vector group and determining a first motion estimation type of the final motion vector, a motion analyzing unit determining an existence of a global motion by analyzing the final motion vector, and externally providing information on the existence of the global motion, a motion estimation type analyzing unit determining a second motion estimation type of neighboring (peripheral) blocks disposed around the block to be interpolated and determining a third motion estimation type on a basis of the first motion estimation type, the second motion estimation type, and the information on the existence of the global motion, a motion compensating unit generating a first pixel for a frame and/or field to be interpolated from a reference frame and/or field by using the final motion vector, a temporal-spatial interpolating unit generating a second pixel for the frame and/or field to be interpolated from a current frame and/or field, the reference frame and/or field, and a pixel (pixels) obtained by the full search, and a format transforming unit transforming a scanning format by adaptively selecting one of the first and second pixels on a basis of at least one of the third motion estimation type and the information on the existence of the global motion.

The motion estimating unit comprises a full search motion estimating unit estimating the first motion vector from motion vectors of whole blocks in a predetermined search range on the basis of the consecutively-inputted current frame/field and reference frame/field, a prediction motion estimating unit estimating the second motion vector from peripheral blocks of the block where the candidate motion vector group is estimated, and a motion vector selecting unit receiving the first and second motion vectors, comparing the first and second motion vectors with a previously-stored first threshold, and selecting a motion vector having a position value of a small error as the final motion vector.

The motion estimating unit comprises a candidate vector group generating unit generating the candidate motion vector group and providing the candidate motion vector group to the prediction motion estimating unit.

The external motion vector is one of a global motion vector, a local motion vector defined by a user, and a zero motion vector.

The motion vector selecting unit includes a motion vector output unit which selects one of the first and second motion vectors as the final motion vector, determines the first motion estimation type of the final motion vector, and outputs the final motion vector and the first motion estimation type, a first threshold storing unit storing a first threshold, and a first threshold selecting unit comparing the first and second motion vectors inputted to the motion vector output unit with the first threshold stored in the threshold storing unit and controlling a selection of the motion vector output unit so that the motion vector having the position value of the small error can be the final motion vector.

The motion vector output unit uses different thresholds in comparison of the motion vectors of candidate motion vector groups provided by the candidate vector group providing unit.

The motion analyzing unit comprises a histogram calculating unit collecting final motion vectors for each block of the frame and/or field to be interpolated, and calculating histogram data of the final motion vectors, a motion analyzing unit determining the existence of the global motion by comparing the histogram data with a previously-stored second threshold, and determining the motion vector corresponding to the global motion as the global motion vector, and a motion type providing unit determining whether the final motion vector is a part of the global motion by comparing the global motion vector with the final motion vector.

When a peak value of the histogram data is greater than the second threshold, the motion analyzing unit determines that the global motion exists.

When the motion type providing unit determines that the final motion vector is the part of the global motion, the scanning format transforming unit transforms the scanning format by using the first pixel generated in the motion compensating unit.

The motion estimation type analyzing unit comprises a first motion estimation type storing unit storing the first motion estimation type of the final motion vector determined from the motion vector, a second motion estimation type storing unit storing a second motion estimation type of the neighboring blocks disposed around the block to be interpolated, and a motion estimation type judging unit determining a third motion estimation type according to the first and second motion estimation types and the information on the existence of the global motion inputted from the motion analyzing unit.

When it is confirmed that the global motion exists according to the information on the existence of the global motion, the motion estimation type judging unit determines that the third motion estimation type is the first motion estimation type.

The format transforming unit comprises a scanning format transforming unit selecting one of the first and second pixels and transforming the scanning format by using the selected pixel and the pixel of the current frame and/or field, and a second threshold selecting unit controlling the scanning format transforming unit to select the first pixel when a SAD of the final motion vector inputted from the motion vector estimating unit is smaller than a previously-stored third threshold.

The format transforming unit comprises a third threshold storing unit storing the third threshold when it is confirmed that the global motion exists according to the information on the existence of the global motion, and the second threshold selecting unit selects a different third threshold according to the global motion vector which is a motion vector of the global motion, the motion type, and the third motion estimation type, and compares the selected different third threshold with the SAD of the final motion vector.

The apparatus further comprises a frame field storing unit storing the pixel of the reference frame and/or field and the pixel of the current frame and/or field.

In another aspect of the present invention, a method of transforming a scanning format includes estimating a final motion vector of a block to be interpolated by selecting one of a first motion vector determined by a full search and a second motion vector predicted by a candidate motion vector group, determining a first motion estimation type of the final motion vector, determining an existence of a global motion by analyzing the final motion vector, externally providing information on the existence of the global motion, determining a second motion estimation type of neighboring (peripheral) blocks disposed around the block to be interpolated, determining a third motion estimation type on the basis of the first motion estimation type, the second motion estimation type, and the information on the existence of the global motion, generating a first pixel for a frame and/or field to be interpolated from a reference frame and/or field by using the final motion vector, generating a second pixel for the frame and/or field to be interpolated from a current frame and/or field, the reference frame and/or field, and a pixel (pixels) obtained by the full search, and transforming the scanning format by adaptively selecting one of the first and second pixels on the basis of at least one of the third motion estimation type and the information on the existence of the global motion.

The estimation and determination operation comprises performing a full search estimation operation of estimating the first motion vector from motion vectors of whole blocks in a predetermined search range on a basis of the consecutively inputted current frame/field and the reference frame/field, a predicted motion estimation operation of estimating the second motion vector, from the neighboring blocks of the block where the candidate motion vector group is estimated, and a motion vector selection operation of receiving the first and second motion vectors, comparing the first and second motion vectors with a previously-stored first threshold, and selecting the motion vector having a position value of a small error as the final motion vector.

An accuracy of the first motion vector estimated in the full search estimation operation is calculated by using accumulated values of differences of pixels of the whole blocks.

The candidate vector group generation operation comprises storing the final motion vector and providing the candidate motion vector group having the final motion vector from a motion vector storing unit and an external motion vector to the predicted motion estimation operation.

The motion vector selection operation comprises comparing the first and second motion vectors with the previously-stored first threshold, selecting the motion vector having the position value of the small error generated in the comparison operation as the final motion vector, determining the first motion estimation type of the final motion vector, and outputting the final motion vector and the first motion estimation type.

The comparison operation uses different first thresholds by candidate motion vector groups provided from the candidate vector group providing operation.

The global motion determination operation comprises a histogram calculation operation of collecting the final motion vectors for each block of the frame and/or field to be interpolated and calculating histogram data of the final motion vectors, a motion analysis operation of determining the existence of the global motion by comparing the histogram data with a previously-stored second threshold and determining the motion vector corresponding to the global motion as the global motion vector, and a motion type providing operation of determining whether the final motion vector is a part of the global motion by comparing the global motion vector with the final motion vector and providing the information on the existence of the global motion.

The method further comprises selecting different second thresholds by the final motion vectors before the motion analysis operation, and when a peak value of the histogram data is greater than the second threshold, the motion analysis operation determines that the global motion exists.

The motion estimation type determination operation comprises storing the first motion estimation type judged from the final motion vector and the second motion estimation type of the neighboring blocks disposed around the block to be interpolated and determining the third motion estimation type according to the first and second motion estimation types and the information on the existence of the global motion.

When it is confirmed that the global motion exists according to the information on the existence of the global motion, the third motion estimation type determination operation determines the first motion estimation type as the third motion estimation type.

The scanning format transformation operation comprises receiving the final motion vector estimated in the estimation judgment operation, and comparing a SAD of the final motion vector with a previously-stored third threshold, and selecting one of the first and second pixels and transforming the scanning format by using the selected pixel and the pixel of the current frame and/or field. The comparison operation controls the first pixel to be selected when the SAD of the final motion vector is smaller that the previously-stored third threshold.

When it is confirmed that the global motion exists before the comparison operation, different third thresholds are used according to the global motion vector which is a motion vector of the global motion and the third motion estimation type.

In accordance with the present invention, when the scanning is transformed from interlaced scanning to progressive scanning or vice versa, the apparatus for and method of estimating the motion and determining the mode can prevent reduction of re-compression performance and improve a re-encoding rate. Moreover, the motion of a de-interlaced image is estimated by generating the candidate vector group from the decoded motion vectors, which results in a decrease of an amount of calculation. It is also possible to perform trans-coding supporting 18 ATSC DTV formats.

BRIEF DESCRIPTION OF THE DRAWINGS

The above aspects, features and advantages of the present invention will become more apparent and more readily appreciated from the following detailed description when taken in conjunction with the accompanying drawings, in which:

FIG. 15 is a detailed block diagram explaining of the scanning format transformation apparatus shown in FIG. 4.

DETAILED DESCRIPTION OF THE PREFERRED EMBODIMENTS

Figure 1:
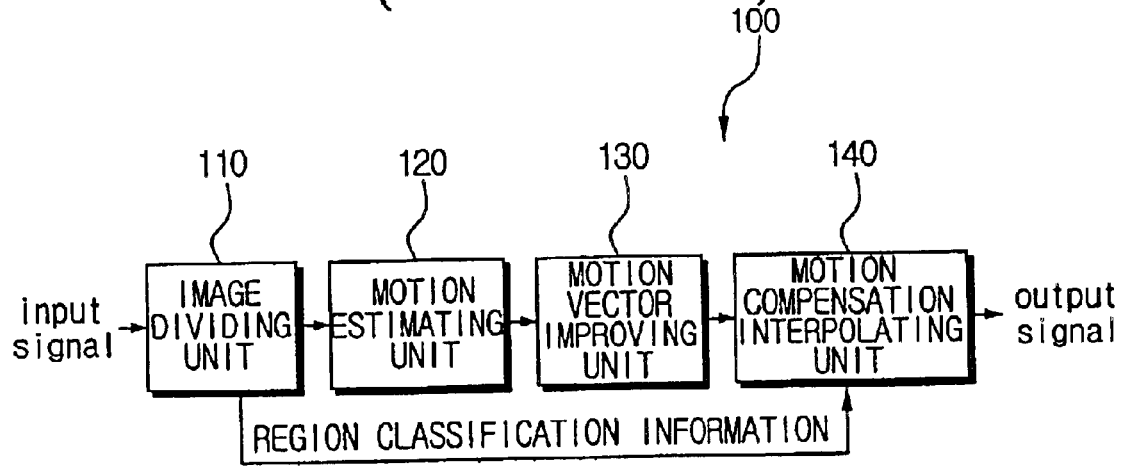
FIG. 1 is a block diagram illustrating a general structure of a conventional apparatus transforming a scanning format.
Figure 2:
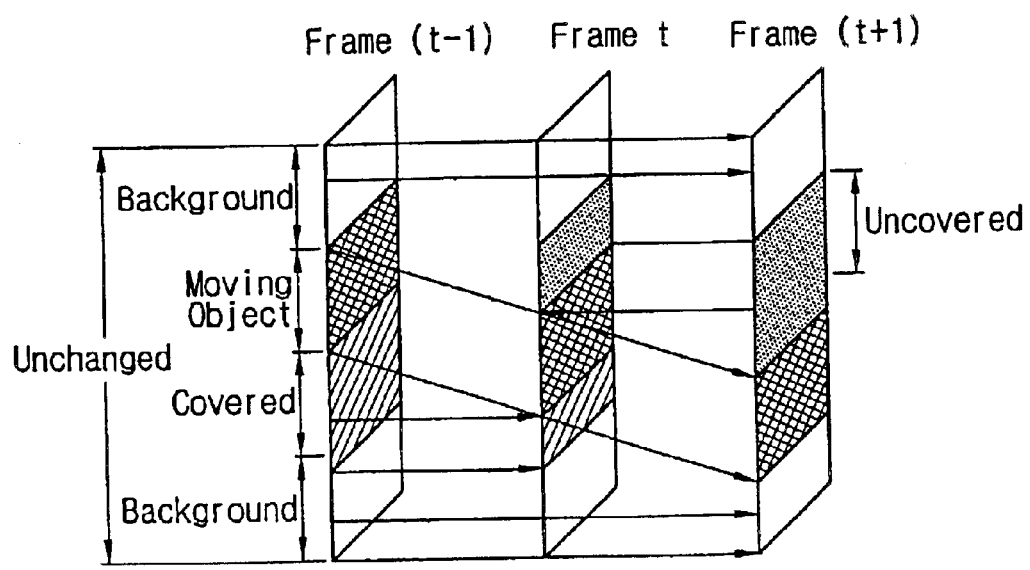
FIG. 2 is a diagram illustrating image division in the conventional apparatus shown in FIG. 1.
Figure 3:
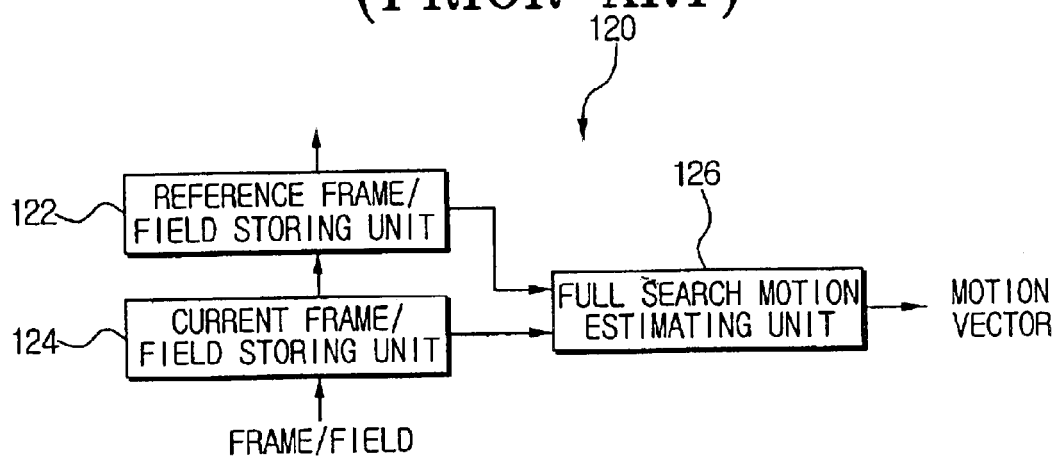
FIG. 3 is a block diagram illustrating a basic structure of a motion estimating unit of the conventional apparatus shown in FIG. 1.

Embodiments of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 4:
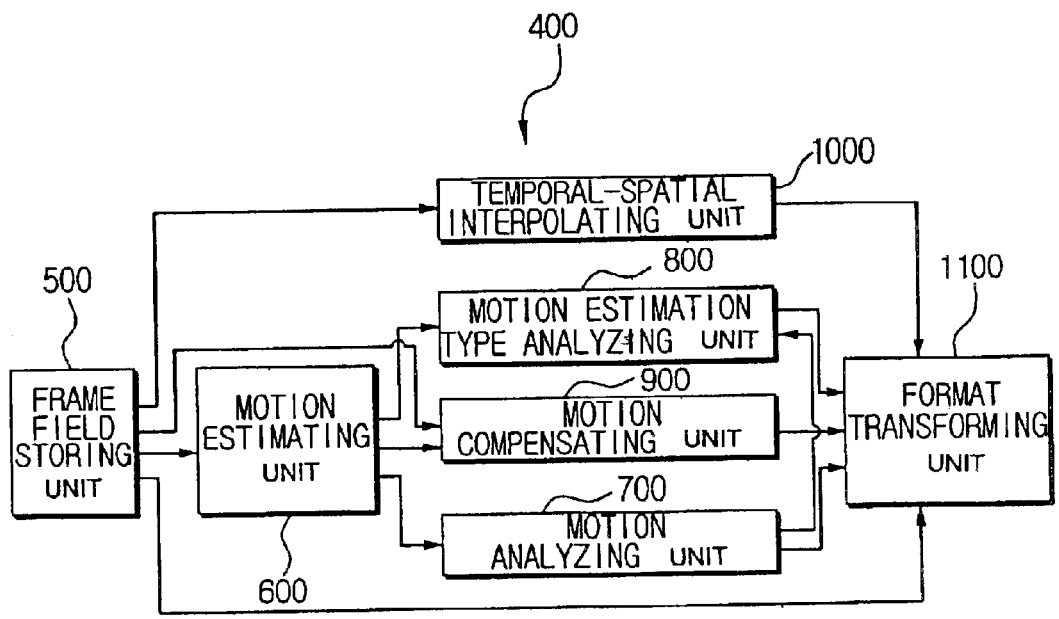
FIG. 4 is a block diagram illustrating a general structure of an apparatus transforming a scanning format in accordance with an embodiment of the present invention.

FIG. 4 is a block diagram illustrating a general structure of an apparatus 400 for transforming a scanning format in accordance with an embodiment of the present invention.

Referring to FIG. 4, the apparatus 400 for transforming the scanning format includes a frame field storing unit 500, a motion estimating unit 600, a motion analyzing unit 700, a motion estimation type analyzing unit 800, a motion compensating unit 900, a temporal-spatial interpolating unit 1000 and a format transforming unit 1100.

Figure 5:
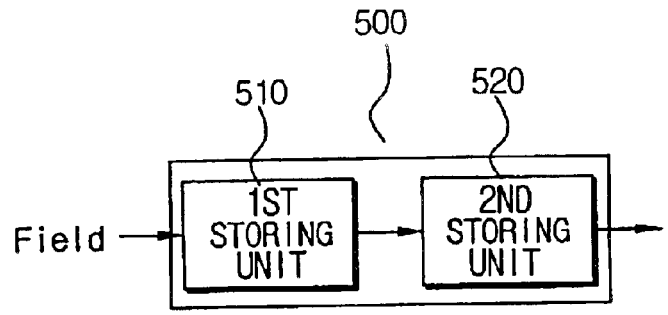
FIG. 5 is a block diagram illustrating a detailed structure of a frame field storing unit of the apparatus shown in FIG. 4.

As illustrated in FIG. 5, the frame field storing unit 500 includes a first storing unit 510 and a second storing unit 520. The first storing unit 510 and the second storing unit 520 respectively store a reference frame/field and a current frame/field. The stored reference frame/field and current frame/field are employed for motion vector estimation, motion compensation, and temporal-spatial interpolation.

Figure 6A:
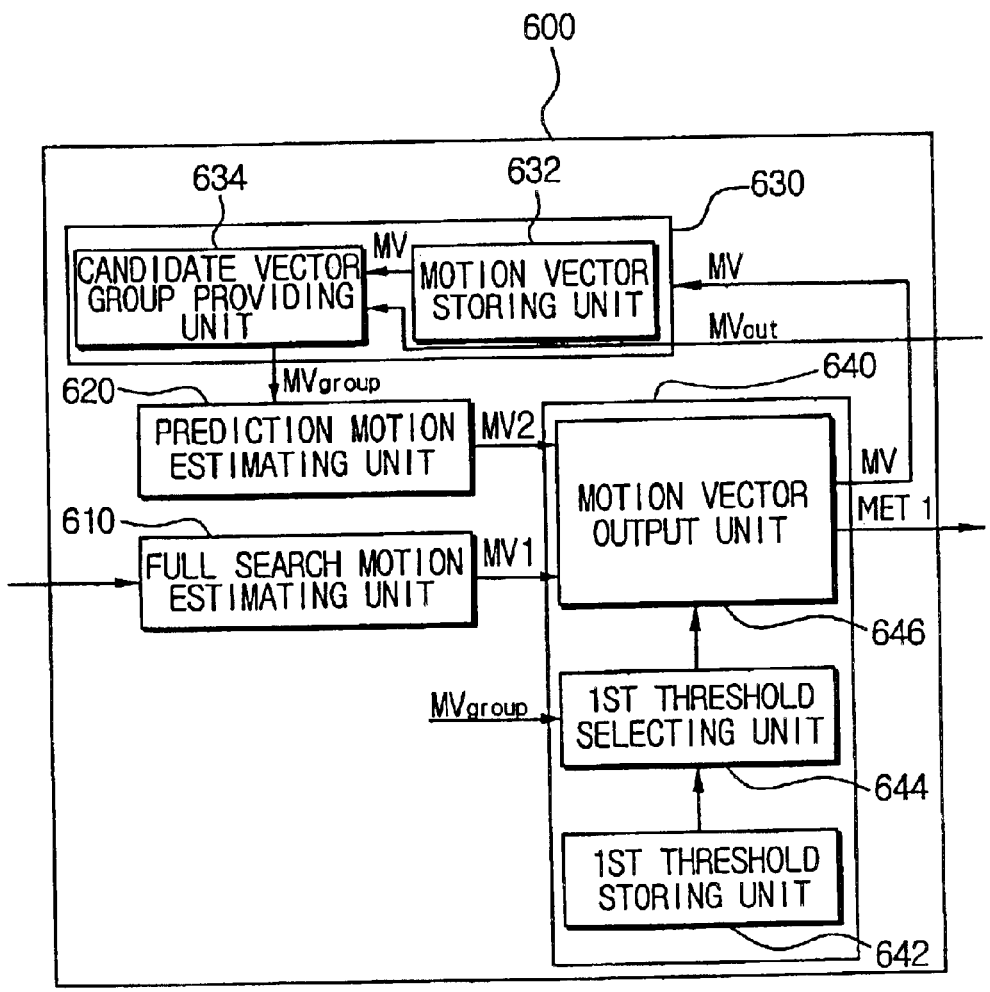
FIG. 6A is a block diagram illustrating a detailed structure of a motion estimating unit of the apparatus shown in FIG. 4.

FIG. 6A is a block diagram illustrating a detailed structure of the motion estimating unit 600 of the apparatus 400 for transforming the scanning format.

As shown in FIG. 6A, the motion estimating unit 600 includes a full search motion estimating unit 610, a prediction motion estimating unit 620, a candidate vector group generating unit 630 and a motion vector selecting unit 640. The motion estimating unit 600 selects one of a first motion vector MV1 determined by a full search and a second motion vector MV2 predicted by a candidate motion vector group, and estimates a final motion vector MV of a block to be interpolated. In addition, the motion estimating unit 600 determines a first motion estimation type of the final motion vector MV.

The full search motion estimating unit 610 estimates the first motion vector MV1 according to a full search motion estimation method. That is, the full search motion estimating unit 610 estimates the first motion vector MV1 from the whole blocks in a predetermined search range on the basis of the reference frame/field and the current frame/field inputted from the first and second storing units 510 and 520. The first motion vector MV1 is a motion vector of the block having a minimum matching error among the blocks located within a maximum displacement of the search range.

In order to obtain the first motion vector MV1 according to the full search motion estimation method, the search range is firstly determined. When it is presumed that the motion of the reference block having a size of 'N×N' in the current frame/field fn is estimated within the range of the pixel '±p' of the reference frame/field f', a size of the motion estimation range of the reference frame/field is '(N+2P)×(N+2P)'. In the full search motion estimation method, correlation coefficients are calculated in the positions of $(2p+1)^2$ which are substitutes of the first motion vector MV1, and the position having the maximum correlation is determined as the first motion vector MV1.

Evaluation functions, such as a mean square error (MSE), mean absolute error (MAE) or mean absolute difference (MAD), may be used to estimate the first motion vector MV1 having the maximum correlation.

$$MSE(i, j) = \frac{1}{MN}\sum_{m=0}^{M}\sum_{n=0}^{N}\left[S_{t,k}(m, n) - S_{t-1,k}(m+1, n+j)\right]^2 \quad \langle\text{Formula 1}\rangle$$

$$MAE(i, j) = \frac{1}{MN}\sum_{m=0}^{M}\sum_{n=0}^{N}\left|S_{t,k}(m, n) - S_{t-1,k}(m+i, n+j)\right| \quad \langle\text{Formula 2}\rangle$$

In formulae 1 and 2, $S_{t,k}$ represents a k-th macro block of a t-th frame/field, and $S_{t-1,k}$ represents a k-th macro block of a (t−1)-th frame/field. Such evaluation functions are based on a difference of pixels to select a motion vector having a smallest MAD or MSE value as the first motion vector MV1.

At the same time, the motion estimating unit 600 estimates the second motion vector MV2 according to a predicted motion estimation method. The predicted motion estimation method is performed in the prediction motion estimating unit 620. The prediction motion estimating unit 620 estimates the second motion vector MV2 from neighboring (peripheral) blocks where the candidate motion vector group provided by the candidate vector group generating unit 630 is estimated. The candidate motion vector group includes at least one candidate motion vector.

The candidate vector group generating unit 630 includes a motion vector storing unit 632 and a candidate vector group providing unit 634. The candidate vector group generating unit 630 generates a candidate motion vector group MVgroup and provides the candidate motion vector group MVgroup to the prediction motion estimating unit 620. The motion vector storing unit 632 stores at least one final motion vector MV.

The candidate vector group providing unit 634 generates the candidate motion vector group MVgroup by using at least one final motion vector MV stored in the motion vector storing unit 632 and at least one external motion vector MVout provided by the motion analyzing unit 730. The external motion vector MVout is one of a global motion vector MVG, a local motion vector MVL defined by a user, and a zero motion vector MVZ. The candidate motion vector group MVgroup includes at least one candidate motion vector. The generated candidate motion vector group MVgroup is provided to the prediction motion estimating unit 620.

Figures 6B, 7:
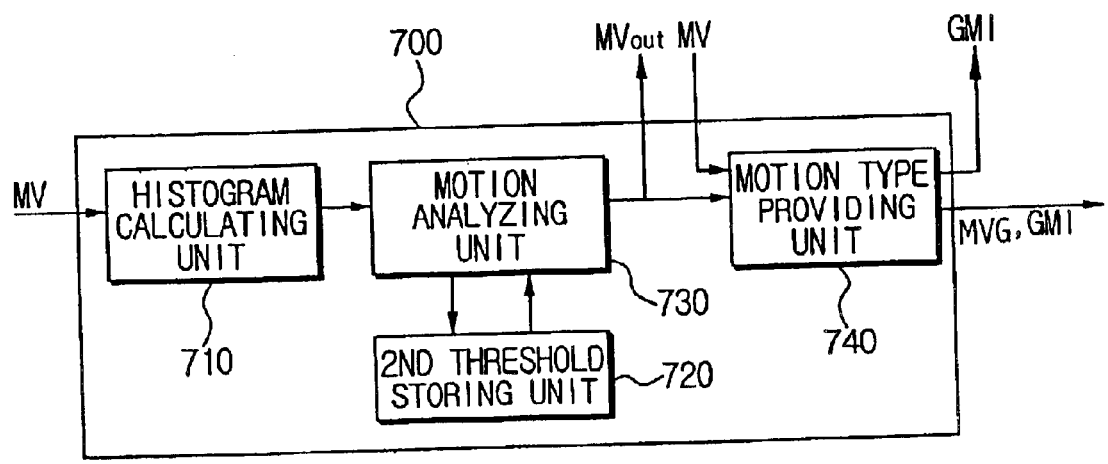
FIG. 6B is a block diagram illustrating a candidate motion vector block and peripheral blocks.
FIG. 7 is a block diagram illustrating a detailed structure of a motion analyzing unit of the apparatus shown in FIG. 4.

The prediction motion estimating unit 620 estimates the second motion vector MV2 from a candidate motion vector block and the neighboring (peripheral) blocks of the candidate motion vector block of FIG. 6B. As shown in FIG. 6B, the candidate motion vector block is a shaded portion, and the neighboring (peripheral) blocks are non-shaded portions. In addition, the motion vector of the candidate motion vector block is represented by '$V_0$', and the motion vector of the peripheral blocks surrounding the candidate motion vector block is represented by $V_i$(i=1, . . . , 8). The prediction motion estimating unit 620 estimates the motion vector of the block having a smallest sum of absolute difference (SAD) among the motion vectors of the peripheral blocks as the second motion vector.

The motion vector selecting unit 640 includes a first threshold storing unit 642, a first threshold selecting unit 644, and a motion vector output unit 646. The first threshold storing unit 642 stores a plurality of first thresholds corresponding to a predetermined motion vector. The first threshold selecting unit 644 selects an appropriate first threshold from the first threshold storing unit 642 according to the motion vector group MVgroup. In addition, the first threshold selecting unit 644 compares the first and second motion vectors MV1 and MV2 inputted to the motion vector output unit 646 with the selected appropriate first threshold and controls the motion vector output unit 646 to select the final motion vector MV so that the motion vector having a position value of a small error can be determined as the final motion vector MV.

The motion vector output unit 646 selects the final motion vector MV from the first and second motion vectors MV1 and MV2 inputted from the full search motion estimating unit 610 and the prediction motion estimating unit 620, respectively. In addition, the motion vector output unit 646 determines a first motion estimation type MET of the final motion vector MV under a control of the first threshold selecting unit 644. The motion estimation type MET1 shows a method or process of estimating the final motion vector MV.

For example, when the SAD of the second motion vector MV2 inputted from the prediction motion estimating unit 620 is greater than the first threshold selected by the candidate motion vector group MVgroup, the motion vector output unit 646 selects the first motion vector MV1 as the final motion vector MV. Therefore, the first motion estimation type MET1 for the final motion vector MV is deemed to be a full search estimation type.

To the contrary, when the SAD of the second motion vector MV2 is smaller than the selected first threshold, the motion vector output unit 646 selects the second motion vector MV2 as the final motion vector MV. Accordingly, the first motion estimation type MET1 for the final motion vector MV is deemed to be a predicted motion estimation type. On the other hand, when the SAD of the second motion vector MV2 is identical to the selected threshold, any of the first and second motion vectors MV1 and MV2 can be used. The final motion vector MV is outputted to the motion vector storing unit 632, and the first motion estimation type MET1 is outputted to a first motion estimation type storing unit 810.

FIG. 7 is a block diagram illustrating a detailed structure of the motion analyzing unit 700 of the apparatus 400 shown in FIG. 4.

As illustrated in FIG. 7, the motion analyzing unit 700 includes a histogram calculating unit 710, a second threshold storing unit 720, a motion analyzing unit 730 and a motion type providing unit 740. The motion analyzing unit 700 determines a motion type MT, namely the existence of the global motion, by analyzing the final motion vector MV outputted from the motion vector output unit 646.

For this, the histogram calculating unit 710 divides an inputted field image into blocks having a size of '8×8'. Thereafter, the histogram calculating unit 710 collects the final motion vectors MV corresponding to the respective blocks and calculates histogram data for the final motion vectors MV. The histogram calculating unit 710 outputs the histogram data to the motion analyzing unit 730.

The second threshold storing unit 720 stores a plurality of second thresholds defined according to a predetermined motion vector. The motion analyzing unit 730 confirms the existence of the global motion and calculates the global motion vector MVG. The motion analyzing unit 730 takes the second threshold corresponding to the final motion vector MV from the second threshold storing unit 720. Then, the motion analyzing unit 730 compares a peak value of the histogram data with the second threshold and determines the motion type MT. The motion type MT is categorized into a global motion, local motion and a zero motion.

When horizontal and vertical histograms are $h_x$ and $h_y$, the existence of the global motion can be estimated and confirmed by the following formula 3:

$$\text{global motion} = \begin{cases} \text{yes,} & \text{if } I_x \neq 0 \text{ or } I_y \neq 0 \\ \text{no,} & \text{otherwise} \end{cases} \quad \langle \text{Formula 3} \rangle$$

$I_x$ and $I_y$ of formula 3 are defined as shown in following formula 4.

$$I_x = \{k | k \in [-sr, sr], k \neq 0, h_{x(k)} > \epsilon_\rho\}$$

$$I_y = \{k | k \in [-sr, sr], k \neq 0, h_{y(k)} > \epsilon_\rho\} \quad \text{<Formula 4>}$$

In formula 4, [−sr, sr] represents a search range, and '$\epsilon_\rho$' represents the second threshold.

The global motion vector $v^g = (V^g_x, V^g_y)^T$ is represented by the following formula 5:

$$v^g = (v^g_x, v^g_y)^T \quad \langle \text{Formula 5} \rangle$$

$$= \left( \arg\max_{k \in [-sr,sr]} h_x(k), \arg\max_{k \in [-sr,sr]} h_y(k) \right)^1$$

Referring to formulae 3 to 5, the motion analyzing unit 730 confirms the existence of the global motion and calculates the global motion vector MVG by using the inputted histogram data. When the peak value of the histogram data is greater than the second threshold, the motion analyzing unit 730 determines that the global motion exists in the field image including the final motion vectors MV of each block. And the motion analyzing unit 730 determines the motion vector corresponding to the global motion as the global motion vector MVG. Since the peak value greater than the second threshold implies that a number of blocks have the identical motion, it can be determined that the global motion exists.

In addition, when there is no motion or only slight motion, the motion analyzing unit 730 determines that the zero motion exists, and determines the motion vector corresponding to the zero motion as the zero motion vector MVZ. When the motion is defined by a user, the motion analyzing unit 730 judges that the local motion exists, and determines the motion vector corresponding to the local motion as the local motion vector MVL.

The motion vector determined in the motion analyzing unit 730 as one of the global motion vector MVG, the zero motion vector MVZ and the local motion vector MVL is outputted to the candidate vector group providing unit 632 and the motion type providing unit 740. The motion vector outputted to the candidate vector group providing unit 632 is the external motion vector MVout.

For this, the motion type providing unit 740 receives the final motion vector MV from the motion vector output unit 646 and the global motion vector MVG from the motion analyzing unit 730. The motion type providing unit 740 confirms whether the final motion vector MV is a part of the global motion by comparing the final motion vector MV with the global motion vector MVG. Thereafter, the motion type providing unit 740 provides the information on the existence of the global motion GMI to a motion estimation type judging unit 830 and a second threshold selecting unit 1120.

Figure 8:
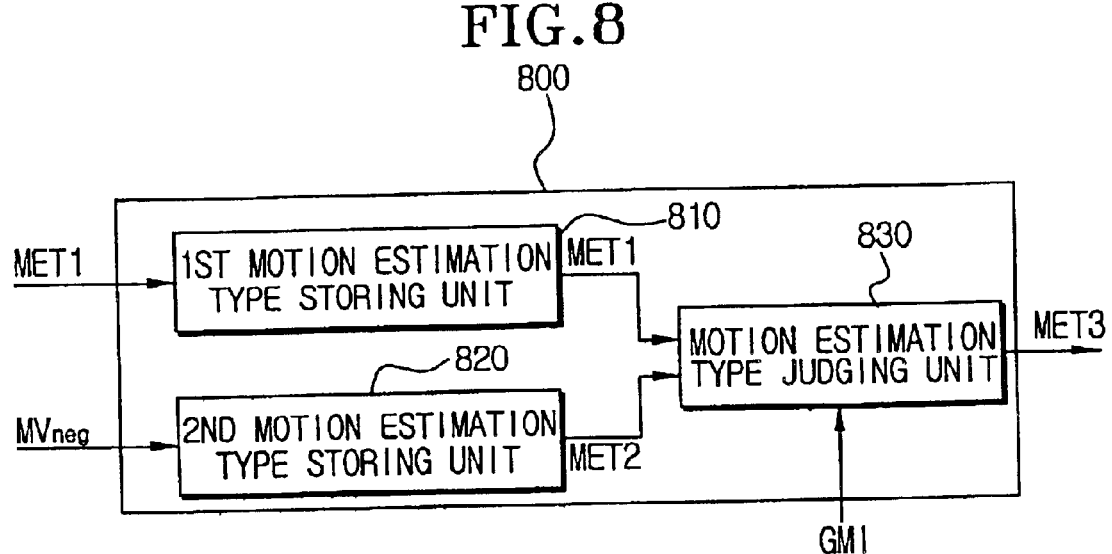
FIG. 8 is a block diagram illustrating a detailed structure of a motion estimation type analyzing unit of the apparatus shown in FIG. 4.

FIG. 8 is a block diagram illustrating a detailed structure of the motion estimation type analyzing unit 800 of the apparatus 400 shown in FIG. 4.

As depicted in FIG. 8, the motion estimation type analyzing unit 800 includes a first motion estimation type storing unit 810, a second motion estimation type storing unit 820 and the motion estimation type judging unit 830. The motion estimation type analyzing unit 800 determines a third motion estimation type MET3 by analyzing the first motion estimation type MET1, a second motion estimation type MET2 of neighboring blocks and the information on the existence of the global motion GMI.

The first motion estimation type storing unit 810 stores the first motion estimation type MET1 of the final motion vector inputted from the motion vector output unit 646. The second motion estimation type storing unit 820 stores the second motion estimation type MET2. The second motion estimation type MET2 is a motion estimation type for one of motion vectors MVneig of neighboring blocks disposed around the block to be interpolated.

The motion estimation type judging unit 830 determines the third motion estimation type MET3 by using the first and second motion estimation types MET1 and MET2 inputted from the first and second motion estimation type storing units 810 and 820 and the information on the existence of the global motion GMI of the block inputted from the motion type determining unit 740. When it is confirmed that the global motion GMI exists according to the information on the existence of the global motion GMI, the motion estimation type judging unit 830 determines that the third motion estimation type MET3 is the first motion estimation type MET1.

To the contrary, when it is confirmed that the global motion does not exist according to the information on the existence of the global motion GMI, the motion estimation type judging unit 830 determines the third motion estimation type MET3 on a basis of the motion estimation type MET of the neighboring blocks disposed around the input block (in case of '3×3=9' blocks, neighboring blocks are 8). That is, the motion estimation type judging unit 830 determines one of motion estimation types MET of the motion vectors MVneig of the neighboring blocks as the third motion estimation type MET3. The one of the motion [types MT] estimation types MET has a largest value corresponding to the second motion estimation type MET2.

The motion compensating unit 900 generates a first pixel pixel1 of the frame and/or field to be interpolated by using the final motion vector MV and the reference frame and/or field ref_pixel stored in the first storing unit 510. On the other hand, the temporal-spatial interpolating unit 1000 generates a second pixel pixel2 of the frame and/or field to be interpolated by using the reference frame and/or field ref_pixel and the current frame and/or field cur_pixel stored in the first and second storing units 510 and 520, and a pixel (pixels) full_pixel obtained by the full search motion estimating unit 610.

Figure 9:
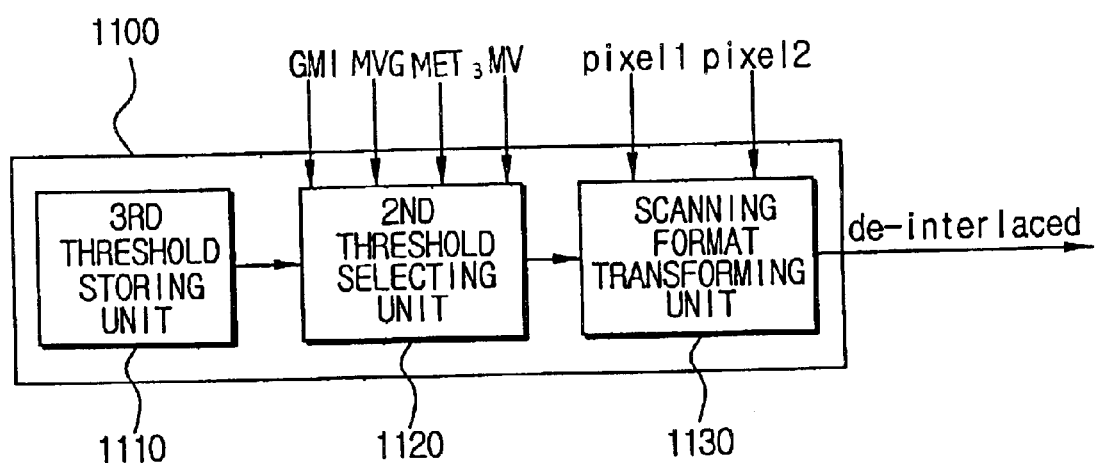
FIG. 9 is a block diagram illustrating a detailed structure of a format transforming unit of the apparatus shown in FIG. 4.

FIG. 9 is a block diagram illustrating a detailed structure of the format transforming unit 1100 of the apparatus 400 shown in FIG. 4.

As depicted in FIG. 9, the format transforming unit 1100 includes a third threshold storing unit 1110, a second threshold selecting unit 1120 and a scanning format transforming unit 1130. The format transforming unit 1100 interpolates the frame and/or field by adaptively selecting one of the first and second pixels pixel1 and pixel2 generated from the motion compensating unit 900 and the temporal-spatial interpolating unit 1000, respectively. When the interpolation is finished, the format transforming unit 1100 outputs a de-interlaced image signal.

The third threshold storing unit 1110 stores a plurality of third thresholds corresponding to a predetermined motion vector. The second threshold selecting unit 1120 receives the final motion vector MV from the motion vector output unit 646, the information on the existence of the global motion GMI and the global motion vector MVG from the motion type providing unit 740, and the third motion estimation type MET3 from the motion estimation type judging unit 830.

In addition, the second threshold selecting unit 1120 selects an appropriate third threshold from the third threshold storing unit 1110 according to the global motion vector MVG and the third motion estimation type MET3. Especially, when selecting the third threshold, the second threshold selecting unit 1120 is much influenced by a determination of whether the final motion vector MV is a part of the global motion. The second threshold selecting unit 1120 compares the SAD of the final motion vector MV with the third threshold and controls format transformation of the scanning format transforming unit 1130.

The scanning format transforming unit 1130 selects one of the first and second pixels pixel1 and pixel2 respectively inputted from the motion compensating unit 900 and the temporal-spatial interpolating unit 1000 under a control of the second threshold selecting unit 1120. For example, when the second threshold selecting unit 1120 determines that the SAD of the final motion vector MV is smaller than the third threshold, the scanning format transforming unit 1130 transforms the scanning format by using the first pixel pixel1. In a case that the SAD of the final motion vector MV is greater than the third threshold, the scanning format transforming unit 1130 transforms the scanning format by using the second pixel pixel2.

A method of transforming a scanning format in accordance with the present invention will now be described with reference to the accompanying drawings.

Figure 10:
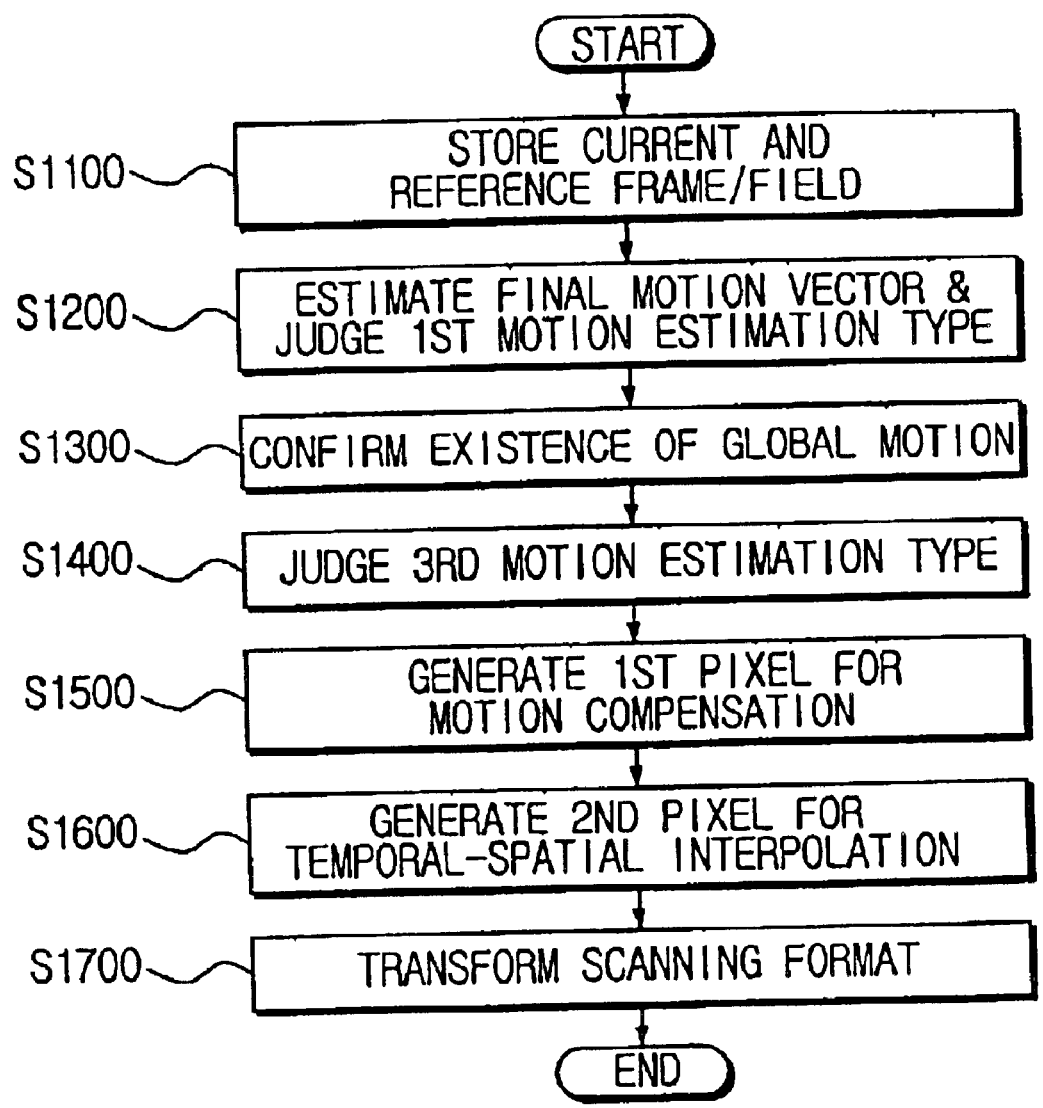
FIG. 10 is a flowchart showing a method of transforming a scanning format in the apparatus shown in FIG. 4.

FIG. 10 is a flowchart showing the method of transforming the scanning format in the apparatus shown in FIG. 4.

As shown in FIG. 10, the reference frame/field and the current frame/field which are used for estimation of the final motion vector and transformation of the scanning format are stored in operation S1100. The final motion vector of the block to be interpolated is estimated by selecting one of the first motion vector determined by full search and the second motion vector predicted by the candidate motion vector group by using the stored frame/field, and the first motion estimation type of the final motion vector is determined in operation S1200.

Thereafter, the existence of the global motion is determined by analyzing the final motion vector in operation S1300. When the existence of the global motion is confirmed, the third motion estimation type is determined on the basis of the first motion estimation type, the second motion estimation type of neighboring blocks disposed around the block to be interpolated, and the information on the existence of the global motion in operation S1400.

On the other hand, the final motion vector estimated in operation S1400 generates the first pixel for motion compensation in operation S1500. That is, the first pixel for the frame and/or field to be interpolated is generated from the reference frame and/or field stored in operation S1100 by using the final motion vector, thereby performing the motion compensation. In addition, the second pixel for the frame and/or field to be interpolated is generated from the reference frame and/or field and the current frame and/or field stored in operation S1100 and a pixel (pixels) obtained by the full search in operation S1600. After the first and second pixels are generated, the scanning format is transformed by adaptively selecting one of the first and second pixels in operation S1700.

Figure 11:
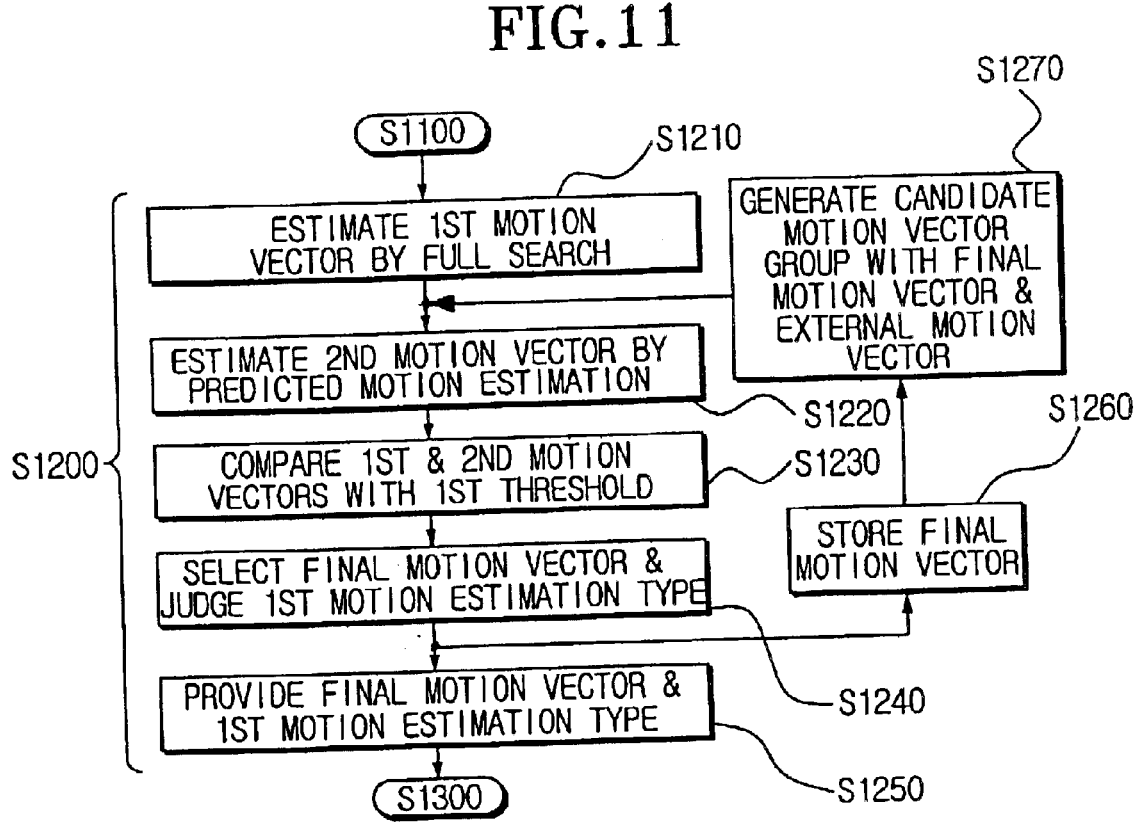
FIG. 11 is a detailed flowchart showing S1200 of the method of transforming the scanning format in FIG. 10.

FIG. 11 is a detailed flowchart showing the operation S1200 of the method shown in FIG. 10.

As illustrated in FIG. 11, the first motion vector is estimated according to the full search motion estimation method in operation S1210. The full search motion estimation method estimates the first motion vector from the motion vectors of the whole blocks in a predetermined search range on the basis of the consecutively inputted current frame and/or field and reference frame and/or field.

Thereafter, the second motion vector is estimated according to the predicted motion vector estimation method in operation S1220. In the predicted motion vector estimation method, the second motion vector is estimated from the blocks neighboring to the block where the candidate motion vector group is estimated. After the first and second motion vectors are estimated, the first motion vector, the second motion vector and the first threshold are compared in operation S1230.

The motion vector having a position value of a small error is selected as the final motion vector, and the motion estimation type of the final motion vector is judged as the first motion estimation type in operation S1240. The final motion vector and the first motion estimation type are externally provided in operation S1250. In more detail, when the SAD of the second motion vector is smaller than the first threshold corresponding to the candidate motion vector group, the second motion vector is selected as the final motion vector. In addition, the motion estimation type of the final motion vector is judged as the predicted motion.

The final motion vector selected in operation S1240 is stored in operation S1260. The candidate motion vector group is generated by using the final motion vector and an external motion vector in operation S1270. The external motion vector is one of the global motion vector, the local motion vector defined by the user, and the zero motion vector.

Figure 12:
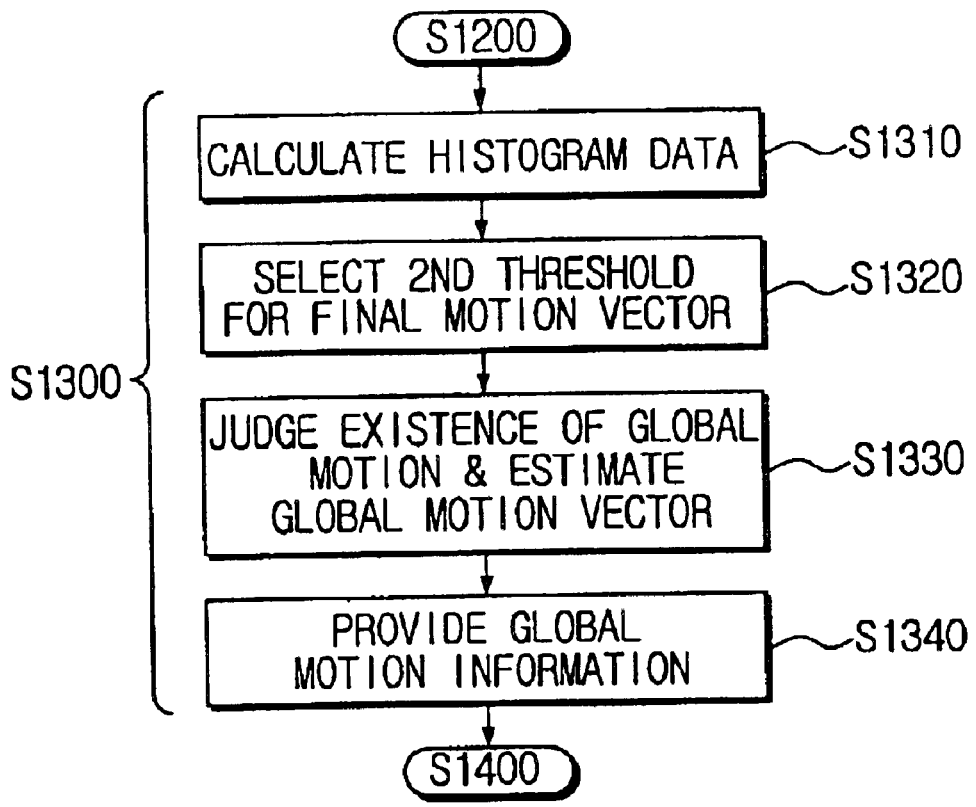
FIG. 12 is a detailed flowchart showing an operation S1300 of the method of transforming the scanning format in FIG. 10.
Figure 13:
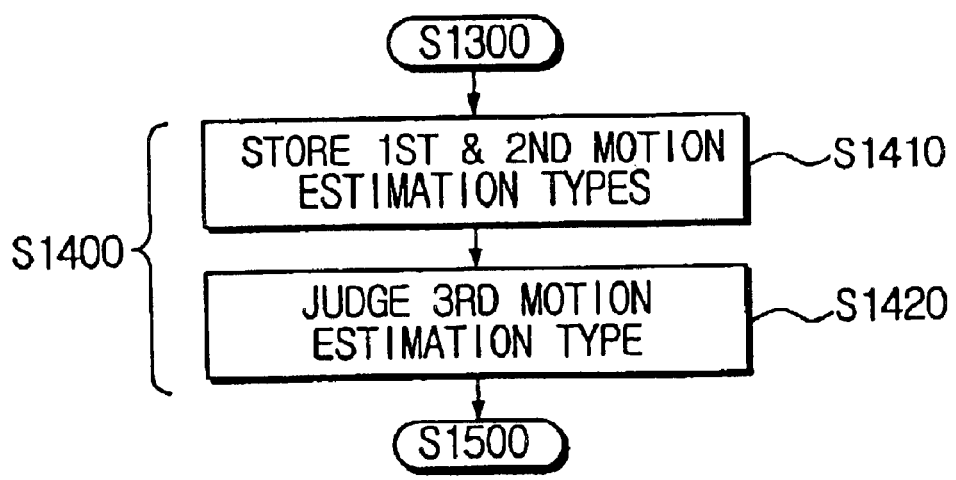
FIG. 13 is a detailed flowchart showing an operation S1400 of the method of transforming the scanning format in FIG. 10.

FIG. 12 is a detailed flowchart showing the operation S1300 of the method shown in FIG. 10, and FIG. 13 is a detailed flowchart showing the operation S1400 of the method shown in FIG. 10.

Referring to FIG. 12, the final motion vectors for each block of the frame and/or field to be interpolated are all collected, and the histogram data for each final motion vector are calculated and outputted in operation S1310. When the histogram data are inputted, the second threshold corresponding to the final motion vector estimated in operation S1244 is selected in operation S1320.

The existence of the global motion is judged by comparing the histogram data with the second threshold, and the motion vector corresponding to the global motion is determined as the global motion vector in operation S1330. For example, when a peak value of the histogram data is greater than the second threshold, it is determined that the global motion exists. In addition, whether the final motion vector is a part of the global motion is judged by comparing the global motion vector of operation S1330 with the final motion vector, and the information on the existence of the global motion is provided in operation S1340.

As shown in FIG. 13, the first motion estimation type determined from the final motion vector and the second motion estimation type of the blocks neighboring to the block to be interpolated are stored in operation S1410. The third motion estimation type is determined according to the first and second motion estimation types and the information on the existence of the global motion of operation S1340 in operation S1420.

In operation S1420, when it is confirmed that the global motion exists according to the information on the existence of the global motion, the first motion estimation type is determined as the third motion estimation type. On the other hand, when it is confirmed that the global motion does not exist, one of motion estimation types of the neighboring blocks is determined as the third motion estimation type MET3. The one of the motion estimation types has a largest value corresponding to the second motion estimation types MET2.

Figure 14:
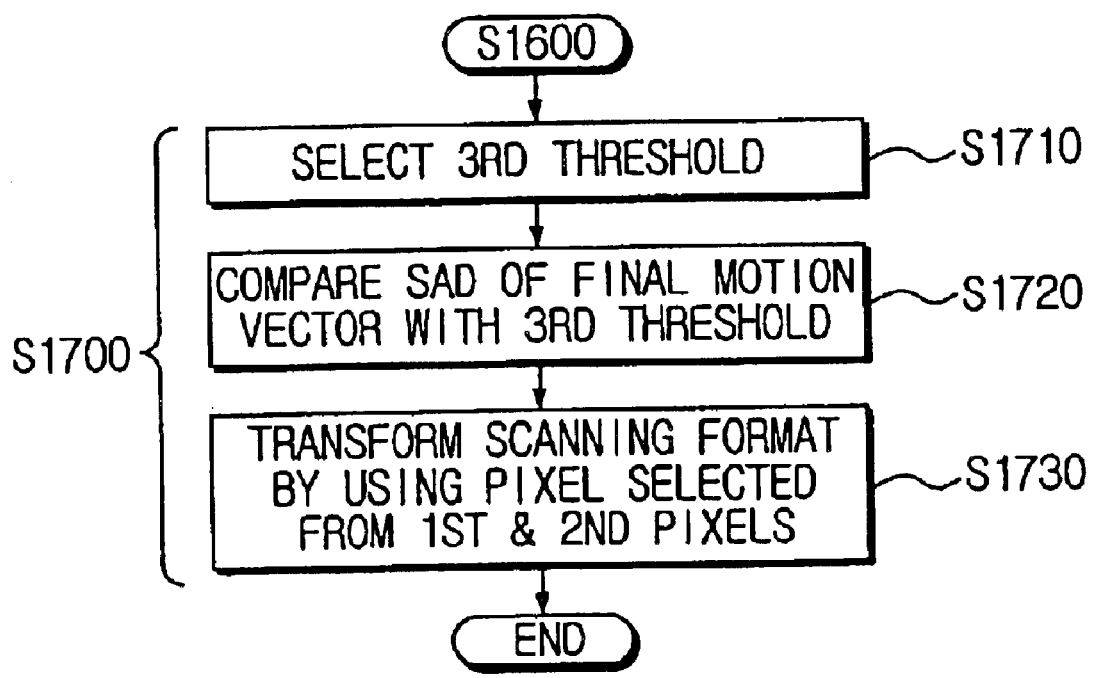
FIG. 14 is a detailed flowchart showing an operation S1700 of the method of transforming the scanning format in FIG. 10.

FIG. 14 is a detailed flowchart showing the operation S1700 of the method shown in FIG. 10.

As illustrated in FIG. 14, the first and second pixels generated in operations S1500 and S1600, the final motion vector estimated in operation S1200, the information on the existence of the global motion and the global motion vector determined in operation S1300, and the third motion estimation type determined in operation S1400 are inputted.

When it is confirmed that the global motion exists according to the information on the existence of the global motion, the third threshold corresponding to the global motion vector and the third motion estimation type are selected in operation S1710. The SAD of the final motion vector is compared with the previously-stored third threshold in operation S1720. One of the first and second pixels is selected according to the comparison result, and the scanning format is transformed by using the selected pixel and the current frame and/or field in operation S1730. In the case that the SAD of the final motion vector is smaller than the third threshold in operation S1720, the first pixel is selected in operation S1730.

FIG. 15 is a detailed block diagram explaining of the scanning format transformation apparatus 400 shown in FIG. 4.

Since FIG. 15 shows the embodiment of the scanning format transformation using FIGS. 4 to 14, detailed explanations of operations of each component are omitted, but a signal flow thereof will now be exemplified.

Referring to FIGS. 4 to 15, the motion vector output unit 646 selects the final motion vector MV, and estimates the first motion estimation type MET1 for the final motion vector. The final motion vector MV is one of the first and second motion vectors MV1 and MV2 estimated by the full search estimating unit 610 and the prediction motion estimating unit 620, respectively.

The final motion vector MV selected by the motion vector output unit 646 is stored in the motion vector storing unit 632 and inputted to the histogram calculating unit 710, the motion type providing unit 830 and the motion compensating unit 900. The candidate vector group providing unit 634 generates the candidate motion vector group MVgroup by using the final motion vector MV stored in the motion vector storing unit 632 and the external motion vector MVout inputted from the motion analyzing unit 730. The candidate motion vector group MVgroup is inputted to the prediction motion estimating unit 620 and the first threshold selecting unit 644.

The motion analyzing unit 730 determines the motion type MT by analyzing the histogram data from the histogram calculating unit 710 and the second threshold, and provides the external motion vector MVout to the candidate vector group providing unit 634. The motion type providing unit 740 provides the information on the existence of the global motion GMI to the motion estimation type judging unit 830 and the second threshold selecting unit 1120.

The first motion estimation type MET1 determined in the motion vector output unit 646 is stored in the first motion estimation type storing unit 810. The second motion estimation type storing unit 820 stores the second motion estimation type MET2 for the motion vectors of the neighboring blocks disposed around the block to be interpolated. The motion estimation type judging unit 830 determines the third motion estimation type MET3 by using the first and second motion estimation types MET1 and MET2 and the information on the existence of the global motion GMI.

The motion compensating unit 900 generates the first pixel pixel1, and the temporal-spatial interpolating means 1000 generates the second pixel pixel2. The second threshold selecting unit 1120 controls the scanning format transforming unit 1130 to select one of the first pixel pixel1 and the second pixel pixel2 according to the motion vector MV, the third motion estimation type MET3, and the information on the existence of the global motion GMI. The scanning format transforming unit 1130 transforms the scanning format by selecting one of the first and second pixels pixel1 and pixel2.

In accordance with the present invention, the final motion vector is estimated according to the motion estimation by the full search and the motion estimation by the candidate motion vector group. The motion vector field having the final motion vector is smoother than the motion vector field having the motion vector obtained by the full search, to minimize deterioration of an image quality during the transformation of the scanning format. In addition, the scanning format transformation method suitable for the field to be interpolated can be adaptively selected by using the motion estimation type showing a route for estimating the final motion vector, the existence of the global motion, and the motion type.

While the invention has been shown and described with reference to a certain preferred embodiment thereof, it will be understood by those skilled in the art that various changes in form and details may be made therein without departing from the spirit and scope of the invention as defined by the appended claims and their equivalents.

What is claimed is:

1. An apparatus for transforming a scanning format, comprising:
    a motion estimating unit estimating a final motion vector of a block to be interpolated by selecting one of a first motion vector determined by a full search and a second motion vector predicted by a candidate motion vector group, and determining a first motion estimation type of the final motion vector;
    a motion analyzing unit determining an existence of a global motion by analyzing the final motion vector, and providing information on the existence of the global motion;
    a motion estimation type analyzing unit determining a second motion estimation type of neighboring blocks disposed adjacent to the block to be interpolated, and determining a third motion estimation type according to the first motion estimation type, the second motion estimation type, and the information on the existence of the global motion;
    a motion compensating unit generating a first pixel for a frame and/or field to be interpolated from a reference frame and/or field by using the final motion vector;
    a temporal-spatial interpolating unit generating a second pixel for the frame and/or field to be interpolated from a current frame and/or field, the reference frame and/or field, and pixels obtained by the full search; and
    a format transforming unit transforming the scanning format by adaptively selecting one of the first and second pixels on a basis of one of the third motion estimation type and the information on the existence of the global motion.

2. The apparatus of claim 1, wherein the motion estimating unit comprises:
    a full search motion estimating unit estimating the first motion vector from motion vectors of whole blocks disposed in a predetermined search range on a basis of the consecutively inputted current frame/field and reference frame/field;
    a prediction motion estimating unit estimating the second motion vector from neighboring blocks disposed around the block where the candidate motion vector group is estimated; and
    a motion vector selecting unit receiving the first and second motion vectors, comparing the first and second motion vectors with a previously-stored first threshold, and selecting one of the first and second motion vectors having a position value of a smallest error as the final motion vector.

3. The apparatus of claim 2, wherein the motion estimating unit comprises:
a candidate vector group generating unit generating the candidate motion vector group and providing the candidate motion vector group to the prediction motion estimating unit.

4. The apparatus of claim 3, wherein the candidate vector group generating unit comprises:
a motion vector storing unit storing the final motion vector; and
a candidate vector group providing unit providing the candidate motion vector group having the final motion vector from the motion vector storing unit and an external motion vector to the prediction motion estimating unit.

5. The apparatus of claim 4, wherein the external motion vector is one of a global motion vector, a local motion vector defined by a user, and a zero motion vector.

6. The apparatus of claim 2, wherein the motion vector selecting unit comprises:
a motion vector output unit selecting one of the first and second motion vectors as the final motion vector, determining the first motion estimation type of the final motion vector, and outputting the final motion vector and the first motion estimation type;
a first threshold storing unit storing a first threshold; and
a first threshold selecting unit selecting the first threshold and controlling the motion vector output unit to compare the first and second motion vectors inputted to the motion vector output unit with the first threshold stored in the threshold storing unit so that a motion vector having a position value of a small error in the comparing of the first and second motion vectors is the final motion vector.

7. The apparatus of claim 6, wherein the motion vector output unit uses a second threshold in comparing a candidate motion vector group provided by a candidate vector group providing unit.

8. The apparatus of claim 7, wherein, when a sum of absolute difference (SAD) of the second motion vector is smaller than the second threshold corresponding to the candidate motion vector group, the motion vector output unit selects the second motion vector as the final motion vector and determines the motion estimation type of the final motion vector as a predicted motion estimation type.

9. The apparatus of claim 2, wherein the full search motion estimating unit calculates an accuracy of the first motion vector by using accumulated values of differences of pixels of the whole blocks.

10. The apparatus of claim 1, wherein the motion analyzing unit comprises:
a histogram calculating unit collecting final motion vectors for each block of the frame and/or field to be interpolated, and calculating histogram data of the final motion vectors;
a motion analyzing unit determining the existence of the global motion by comparing the histogram data with a previously-stored second threshold, and determining a motion vector corresponding to the global motion as a global motion vector; and
a motion type providing unit determining whether the final motion vector is a part of the global motion by comparing the global motion vector with the final motion vector.

11. The apparatus of claim 10, wherein the motion analyzing unit further comprises:

a second threshold storing unit storing the second threshold.

12. The apparatus of claim 10, wherein the motion analyzing unit compares the histogram data with different second thresholds by the final motion vectors.

13. The apparatus of claim 12, wherein, when a peak value of the histogram data is greater than the second threshold, the motion analyzing unit determines that the global motion exists.

14. The apparatus of claim 12, wherein, when the motion type providing unit determines that the final motion vector is the part of the global motion, the scanning format transforming unit transforms the scanning format by using the first pixel generated in the motion compensating unit comprises:
a first motion estimation type storing unit storing the first motion estimation type of the final motion vector determined from the motion vector;
a second motion estimation type storing unit storing the second motion estimation type of the neighboring blocks; and
a motion estimation type judging unit determining the third motion estimation type according to the first and second motion estimation types and the information on the existence of the global motion inputted from the motion analyzing unit.

15. The apparatus of claim 14, wherein in response to confirmation that the global motion exists according to the information on the existence of the global motion, the motion estimation type judging unit determines that the third motion estimation type is the first motion estimation type.

16. The apparatus of claim 1, wherein the format transforming unit comprises:
a scanning format transforming unit selecting one of the first and second pixels, and transforming the scanning format by using the selected pixel and the pixel of the current frame and/or field; and
a second threshold selecting unit controlling the scanning format transforming unit to select the first pixel when an SAD of the final motion vector inputted from the motion vector estimating unit is smaller than a previously-stored third threshold.

17. The apparatus of claim 16, wherein the format transforming unit further comprises:
a third threshold storing unit storing the third threshold.

18. The apparatus of claim 16, wherein in response to confirmation that the global motion exists according to the information on the existence of the global motion, the second threshold selecting unit selects one of different third thresholds according to a global motion vector which is a motion vector of the global motion and the third motion estimation type, and compares the one different third threshold with the SAD of the final motion vector.

19. The apparatus of claim 1, further comprising:
a frame/field storing unit storing the pixel of the reference frame and/or field and the pixel of the current frame and/or field.

20. The apparatus of claim 18, wherein the frame/field storing unit comprises:
a first storing unit storing the reference frame and/or field; and
a second storing unit storing the current frame and/or field.

21. A method of transforming a scanning format, comprising:
estimating a final motion vector of a block to be interpolated by selecting one of a first motion vector determined by full search and a second motion vector predicted by a candidate motion vector group, and determining a first motion estimation type of the final motion vector;

determining existence of a global motion by analyzing the final motion vector, and externally providing information on the existence of the global motion;

determining a second motion estimation type of peripheral blocks disposed adjacent to the block to be interpolated, and determining a third motion estimation type on a basis of the first motion estimation type, the second motion estimation type, and the information on the existence of the global motion;

generating a first pixel for a frame and/or field to be interpolated from a reference frame and/or field by using the final motion vector;

generating a second pixel for the frame and/or field to be interpolated from a current frame and/or field, the reference frame and/or field, and a pixel obtained by the full search; and transforming the scanning format by adaptively selecting one of the first and second pixels on the basis of at least one of the third motion estimation type and the information on the existence of the global motion.

22. The method of claim 21, wherein the estimating of the final motion vector comprises:

performing a full search estimation operation of estimating the first motion vector from motion vectors of the whole blocks in a predetermined search range on a basis of the consecutively-inputted current frame/field and reference frame/field;

performing a predicted motion estimation operation of estimating the second motion vector from the peripheral blocks of the block where the candidate motion vector group is estimated; and performing a motion vector selection operation of receiving the first and second motion vectors, comparing the first and second motion vectors with a previously-stored first threshold, and selecting the motion vector having a position value of small error as the final motion vector.

23. The method of claim 22, wherein the full search estimation operation comprises:

calculating an accuracy of the first motion vector by using accumulated values of differences of pixels of whole blocks.

24. The method of claim 22, wherein the estimating of the final motion vector comprises:

performing a candidate vector group generation operation of generating the candidate motion vector group before the predicted motion estimation operation.

25. The method of claim 24, wherein the candidate vector group generation operation comprises:

storing the final motion vector; and providing the candidate motion vector group including the final motion vector from the motion vector storing unit and an external motion vector to the predicted motion estimation operation.

26. The method of claim 25, wherein the providing of the candidate motion vector group comprises:

generating the external motion vector from a global motion vector, a local motion vector defined by a user, and a zero motion vector.

27. The method of claim 22, wherein the motion vector selection operation comprises:

comparing the first and second motion vectors with the previously-stored first threshold;

selecting the motion vector having a position value of a small error as the final motion vector, and determining the first motion estimation type of the final motion vector; and outputting the final motion vector and the first motion estimation type.

28. The method of claim 27, wherein the comparing of the first and second motion vectors comprises:

using a different first threshold according to by the candidate motion vector groups provided by the candidate vector group providing group.

29. The method of claim 27, wherein, when a sum of absolute difference (SAD) of the second motion vector is smaller than the first threshold corresponding to the candidate motion vector group, the selecting of the motion vector comprises:

selecting the second motion vector as the final motion vector; and determining the motion estimation type of the final motion vector as a predicted motion estimation type.

30. The method of claim 21, wherein the determining of the existence of the global motion comprises:

performing a histogram calculation operation of collecting the final motion vectors for each block of the frame and/or field to be interpolated, and calculating histogram data of the final motion vectors;

performing a motion analysis operation of determining the existence of the global motion by comparing the histogram data with a previously-stored second threshold, and determining the motion vector corresponding to the global motion as the global motion vector; and performing a motion type providing operation of determining judging whether the final motion vector is a part of the global motion by comparing the global motion vector with the final motion vector, and providing the information on the existence of the global motion.

31. The method of claim 30, the determining of the existence of the global motion comprises:

selecting different second threshold according to the final motion vectors before the motion analysis operation.

32. The method of claim 31, wherein, when a peak value of the histogram data is greater than the second threshold, the motion analysis operation comprises:

determining that the global motion exists.

33. The method of claim 21, wherein the determining of the second and third motion estimation types comprises:

storing the first motion estimation type determined from the final motion vector and the second motion estimation type of the peripheral blocks; and determining the third motion estimation type according to the first and second motion estimation types and the information on the existence of the global motion.

34. The method of claim 33, wherein in response to confirmation that the global motion exists according to the information on the existence of the global motion, the determining of the third motion estimation type comprises:

determining the first motion estimation type as the third motion estimation type.

35. The method of claim 21, wherein the transforming of the scanning format comprises:

receiving the final motion vector and comparing an SAD of the final motion vector with a previously-stored third threshold; and selecting one of the first and second pixels, and transforming the scanning format by using the selected pixel and the pixel of the current frame and/or field, and controlling the first pixel to be selected when the SAD of the final motion vector is smaller that the previously-stored third threshold.

36. The method of claim 35, wherein in response to confirmation that the global motion exists, the comparing of the SAD comprises:

selecting a different third threshold used according to a global motion vector which is a motion vector of the global motion and the third motion estimation type.

37. The method of claim 21, further comprising:

storing the pixel of the reference frame and/or field and the pixel of the current frame and/or field before the estimating of the final motion vector.

38. An apparatus for transforming a scanning format from current and reference image frames/fields each having blocks each having pixels, comprising:

a motion estimating unit estimating a first motion vector of each block, estimating a second motion vector of one of neighboring blocks of the block, comparing the first motion vector and the second motion vector with a first threshold to select one of the first motion vector and the second motion vector as a final motion vector of each block, and generating a first motion estimation type of the final motion vector;

a motion analyzing unit comparing final motion vectors of the blocks with a second threshold to determine an existence of a global motion of the blocks, and generating information on the existence of the global motion;

a motion estimation type analyzing unit determining a second motion estimation type representing motion vectors of the neighboring blocks, and determining one of the first motion estimation type and the second motion estimation type as a third motion estimation type in response to the information on the existence of the global motion;

a motion compensating unit generating a first pixel of a frame/field to be interpolated from the reference frame/field by using the final motion vector;

a temporal-spatial interpolating unit generating a second pixel of the frame/field to be interpolated from the current frame/field and the reference frame/field; and a format transforming unit determining a third threshold according to the third motion estimation type and the information on the existence of the global motion, and selecting one of the first pixel and the second pixel according to a comparison between the final motion vector and the third threshold value to form the scanning format.

39. The apparatus of claim 38, wherein the motion estimating unit selects one of motion vectors of the block of the current image frames/fields using a full search method as the first motion vector, and the one of the vectors has a minimum matching error with blocks of the reference image frames/fields.

40. The apparatus of claim 38, wherein the motion estimating unit selects one of motion vectors of the neighboring blocks using a prediction motion estimation method as the second motion vector, the one of the motion vectors having a smallest sum of absolute difference of the motion vectors of the neighboring blocks.

41. The apparatus of claim 38, wherein the first threshold varies according to a candidate motion vector group having the final motion vector, a global motion vector corresponding to one or a combination of the global motion, a local motion vector defined by a user, and a zero motion vector corresponding to a zero motion value.

42. The apparatus of claim 38, wherein the motion estimating unit determines the first motion vector as the final motion vector when a sum of absolute difference of the first motion vector is greater than the first threshold, and determines the second motion vector as the final motion vector when a sum of absolute difference of the second motion vector is greater than the first threshold.

43. The apparatus of claim 38, wherein the first motion estimation type represents a motion type of one of the first motion vector and the second motion vector.

44. The apparatus of claim 38, wherein the first motion estimation type represents a full search motion estimation type when the first motion vector is selected as the final motion vector, and the first motion estimation type represents a prediction motion estimation type when the second motion vector is selected as the final motion vector.

45. The apparatus of claim 38, wherein the motion analyzing unit generating a histogram data from the final motion vectors of the blocks and compares a peak value of the histogram data with the second threshold to determine whether the global motion exists.

46. The apparatus of claim 45, wherein the motion analyzing unit determines that the global motion exists when the peak value of the histogram is greater than the second threshold.

47. The apparatus of claim 45, wherein the existence of the global motion represents that a number of the blocks have identical motion.

48. The apparatus of claim 45, wherein the motion analyzing unit generates a global motion vector corresponding to the global motion and compares the global motion vector and the final motion vector to determine that the final motion vector is a part of the global motion.

49. The apparatus of claim 48, wherein the motion analyzing unit generates the information on the existence of the global motion in response to that confirmation that the final motion vector is a part of the global motion.

50. The apparatus of claim 38, wherein the motion estimation type analyzing unit determines the first motion estimation type as the third motion estimation type when the information represents that the global motion exists, and determines the second motion estimation type as the third motion estimation type when the information represents that the global motion does not exist.

51. The apparatus of claim 38, wherein the motion estimation type analyzing unit determines one of motion types of motion vectors of the neighboring blocks as the third motion estimation type when the information represents that the global motion does not exist, the one of the motion types of the neighboring blocks having a largest amount of motion in the motion types of the motion vectors of the neighboring blocks.

52. The apparatus of claim 38, wherein the motion estimation type analyzing unit selects the first pixel as the scanning format when a sum of absolute difference of the final motion vector is less than the third threshold, and selects the second pixel as the scanning format when the sum of absolute difference of the final motion vector is greater than the third threshold.

53. The apparatus of claim 38, wherein the third threshold varies according to a determination of whether the final motion vector is a part of the global motion.

54. An apparatus for transforming a scanning format from current and reference image frames/fields each having blocks each having pixels, comprising:

a motion estimating unit estimating a first motion vector of each block, estimating a second motion vector of one of neighboring blocks of the block, generating a final motion vector according to the first motion vector and the second motion vector, and generating a first motion estimation type of the final motion vector;

a motion analyzing unit generating information on an existence of a global motion according to the final motion vector;

a motion estimation type analyzing unit determining a second motion estimation type representing motion vectors of the neighboring blocks, and determining one of the first motion estimation type and the second motion estimation type as a third motion estimation type in response to the information on the existence of the global motion;

a motion compensating unit generating a first pixel formed according to the final motion vector;

a temporal-spatial interpolating unit generating a second pixel formed according to the current frame/field and the reference frame/field; and a format transforming unit selecting one of the first pixel and the second pixel according to the third motion estimation type and the information on the existence of the global motion to form the scanning format.

55. A method of transforming a scanning format from current and reference image frames/fields each having blocks each having pixels, comprising:

estimating a first motion vector of each block and a second motion vector of one of neighboring blocks of the block, comparing the first motion vector and the second motion vector with a first threshold to select one of the first motion vector and the second motion vector as a final motion vector of each block, and generating a first motion estimation type of the final motion vector;

comparing final motion vectors of the blocks with a second threshold to determine an existence of a global motion of the blocks, and generating information on the existence of the global motion;

determining a second motion estimation type representing motion vectors of the neighboring blocks, and determining one of the first motion estimation type and the second motion estimation type as a third motion estimation type in response to the information on the existence of the global motion;

generating a first pixel of a frame/field to be interpolated from the reference frame/field by using the final motion vector;

generating a second pixel of the frame/field to be interpolated from the current frame/field and the reference frame/field; and determining a third threshold according to the third motion estimation type and the information on the existence of the global motion, and selecting one of the first pixel and the second pixel according to a comparison between the final motion vector and the third reference value to form the scanning format.

* * * * *

UNITED STATES PATENT AND TRADEMARK OFFICE
CERTIFICATE OF CORRECTION

PATENT NO. : 6,990,148 B2
DATED : January 24, 2006
INVENTOR(S) : Seung-joon Yang It is certified that error appears in the above-identified patent and that said Letters Patent is hereby corrected as shown below:

Column 18,
Line 58, replace "claim 18", with -- claim 19 --.

Signed and Sealed this

Thirtieth Day of May, 2006

JON W. DUDAS
*Director of the United States Patent and Trademark Office*